United States Patent
DeHart

(10) Patent No.: US 7,072,349 B2
(45) Date of Patent: Jul. 4, 2006

(54) ETHERNET DEVICE AND METHOD FOR EXTENDING ETHERNET FIFO BUFFER

(75) Inventor: Kenton G. DeHart, Peoria, AZ (US)

(73) Assignee: STMicroelectronics, Inc., Carrollton, TX (US)

( * ) Notice: Subject to any disclaimer, the term of this patent is extended or adjusted under 35 U.S.C. 154(b) by 943 days.

(21) Appl. No.: 09/969,137

(22) Filed: Oct. 2, 2001

(65) Prior Publication Data

US 2003/0063567 A1 Apr. 3, 2003

(51) Int. Cl.
H04L 12/56 (2006.01)
(52) U.S. Cl. .............. 370/412; 370/419; 370/231
(58) Field of Classification Search .......... 370/252, 370/412, 428, 429
See application file for complete search history.

(56) References Cited

U.S. PATENT DOCUMENTS

| | | | | |
|---|---|---|---|---|
| 5,450,549 A | 9/1995 | Casparian | ............. | 395/250 |
| 5,513,376 A | 4/1996 | Lohmeyer | ............. | 395/873 |
| 5,546,385 A | 8/1996 | Caspi et al. | ............. | 370/58.2 |
| 5,548,796 A | 8/1996 | Ketchum | ............. | 395/872 |
| 5,754,540 A | 5/1998 | Liu et al. | ............. | 370/315 |
| 5,892,768 A | 4/1999 | Jeng | ............. | 370/445 |
| 5,982,778 A * | 11/1999 | Mangin et al. | ............. | 370/445 |
| 6,023,338 A | 2/2000 | Bareket | ............. | 356/401 |
| 6,097,705 A | 8/2000 | Ben-Michael et al. | ............. | 370/315 |
| 6,222,852 B1 | 4/2001 | Gandy | ............. | 370/463 |
| 6,385,208 B1 * | 5/2002 | Findlater et al. | ............. | 370/419 |
| RE38,309 E * | 11/2003 | Frazier et al. | ............. | 370/231 |
| 6,760,338 B1 * | 7/2004 | Merchant et al. | ............. | 370/395.7 |
| 6,954,425 B1 * | 10/2005 | Chen et al. | ............. | 370/229 |
| 6,975,637 B1 * | 12/2005 | Lenell | ............. | 370/412 |
| 2002/0034195 A1 * | 3/2002 | Chen et al. | ............. | 370/519 |
| 2002/0159460 A1 * | 10/2002 | Carrafiello et al. | ............. | 370/392 |

FOREIGN PATENT DOCUMENTS

GB 2 349 296 A 10/2000

OTHER PUBLICATIONS

"Ethernet Standard IEEE802.3; Part 3: Carrier Sense Multiple Access With Collision Detection (CSMA/CD) Access Method and Physical Layer Specifications," Oct. 16, 2000; IEEE, pp. 511-512, 544-546, 549-562.

* cited by examiner

Primary Examiner—Dang Ton
Assistant Examiner—Michael J. Moore
(74) Attorney, Agent, or Firm—Lisa K. Jorgenson; Christopher F. Regan

(57) ABSTRACT

A method and ethernet device is disclosed and includes an extended FIFO buffer. The link partner within the ethernet system is in communication with data terminal equipment (DTE). The speed of the link partner determined using a first packet received within the FIFO buffer. Subsequent FIFO buffer reading is optimized based on the determined speed of the link partner, thus for enhancing the inter-packet gap space usage.

21 Claims, 3 Drawing Sheets

ETHERNET DEVICE AND METHOD FOR EXTENDING ETHERNET FIFO BUFFER

FIELD OF THE INVENTION

This invention relates to the field of ethernet systems, and more particularly, this invention relates to extended FIFO buffers used in ethernet systems and devices.

BACKGROUND OF THE INVENTION

Ethernet local area network (LAN) systems are becoming increasingly popular because the open standards associated with ethernet systems make this network available to almost everyone having a desire for networked computer systems. An ethernet interface can normally operate at 10 megabits per second (Mbps), and at fast ethernet speeds the interface operates at 100 Mbps, making it suitable for a wide variety of applications. Different computers can be linked with vendor-neutral network technology. The ethernet standard is formalized as IEEE 802.3 Carrier Sense Multiple Access with Collision Detection (CSMA/CD) access method of the physical layer specifications developed by the Institute of Electrical and Electronic Engineers, and adopted by the International Organization for Standardization (ISO). The ethernet system includes a physical medium to carry the ethernet packet signals between computers, a set of medium access control rules embedded in each ethernet interface, and an ethernet frame or packet that is a standardized set of bits to carry data over the system.

An ethernet system includes a number of Data Terminal Equipment (DTE), typically computers, which are connected in the network. Each Data Terminal Equipment includes a port having a physical layer and a Media Access Control (MAC) typically connected by an n-pin connector (e.g., a 40-pin connector), via a media independent interface (MII), to a physical layer device (PHY), such as a transceiver, as known to those skilled in the art. This ethernet device includes a First-In, First-Out (FIFO) buffer that is also operable with a Medium Dependent Interface (MDI), such as a twisted-pair connector or fiberoptic connector. A typical connector includes an RJ-45 connector connected to the physical medium that carries the ethernet signals. Other optical connectors can also be used, depending on the design.

As known to those skilled in the art, an inter-packet gap (IPG) space is required as the FIFO buffer receives and empties data from packets. A physically-large FIFO buffer cannot be used in ethernet applications because a larger FIFO buffer violates the smallest possible inter-packet gap (IPG) space as the buffer receives the packets. The FIFO buffers are necessary when used with a media independent interface (MII), including a serial mode independent interface (SMII) and reduced media independent interface (RMII). The standard system clock is driven from the media access control (MAC), which implements two clock domains. Thus, data is buffered through the FIFO buffer. Because the time separation between clock domains is small, the FIFO buffers used in the ethernet systems are not large and can be about 64 bits.

In prior art devices, the FIFO buffer was always receiving data until it was half-full and configured to work with a half-full pointer. Thus, a good portion of the FIFO buffer remained unused and the inter-packet gap (IGP) space size was not efficiently configured.

SUMMARY OF THE INVENTION

The present invention advantageously extends the ethernet FIFO buffer such that it can be operated in an extended mode where it appears to be larger while avoiding the limitations that are associated with larger FIFO designs used in typical ethernet applications. A large FIFO buffer has greater tolerance for handling link partner and local device frequency variances without violating the smallest possible inter-packet gap space. Thus, the present invention provides an advantageous improvement over standard, prior art ethernet FIFO buffers that waited until the FIFO buffer was half full until it began to empty out. In the past previous prior art systems, this was required because it was unknown whether the link partner was faster or slower. In the extended mode operation of the present invention, the FIFO buffer uses the first packet transfer to determine the speed of a link partner and dynamically reconfigures itself to optimize read controls based on the speed of the link partner. For example, if the link partner is operating faster, then subsequent FIFO buffer reading could begin, as an example, after only the first nibble, i.e., 4 bits, have been written. Thus, the FIFO buffer can use much of its full size to buffer data and increase the ability of physically smaller FIFO buffers to obtain greater tolerance ratings and enhance the inter-packet gap space usage.

In accordance with the present invention, the method extends the ethernet FIFO buffer in a physical layer device of an ethernet system having data terminal equipment (DTE) and a media access control (MAC) and connected by a media independent interface (MII) to the physical layer device. The speed of a link partner in communication with data terminal equipment (DTE) is determined, using a first packet received within the FIFO buffer. Subsequent reading of the FIFO buffer is optimized based on the determined speed of the link partner, thus enhancing the inter-packet gap space usage.

In one aspect of the present invention, the step of optimizing any subsequent reading of the FIFO buffer comprises the step of reconfiguring a half-full pointer used with the FIFO buffer. Any reading of the FIFO buffer can occur at the next succeeding packet received after the first packet. The FIFO buffer can be read after only a first nibble of 4 bits has been written therein when the link partner has been determined to be running faster.

In yet another aspect of the present invention, the media independent interface (MII) comprises one of a serial media independent interface (SMII) or reduced media independent interface (RMII). Toggle bits associated with the packets and media independent interface data can be used as control bits to identify whether the slots within the FIFO buffer are valid. For example, a control bit can be used to identify an incoming packet as a valid packet. In this type of ethernet application, the media access control (MAC) is operated with a reference clock, and media independent interface (MII) is operated with a recovered clock. An n-pin connector, such as a 40-pin or other connector, could connect the media independent interface (MII) to the media access control (MAC) as is known to those skilled in the art.

In yet another aspect of the present invention, the FIFO buffer is filled to a half-full position with the first packet received within the FIFO buffer. This can occur by evaluating toggle bits of a first packet received within the FIFO buffer. The number of slots that remain to be read before the FIFO buffer is empty can be determined. This allows the speed of the link partner in communication therewith to be determined. Based upon the determined speed of this link partner, in one aspect of the present invention, the half-full point is reconfigured for optimizing subsequent reading of the FIFO buffer.

In yet another aspect of the present invention, an ethernet device includes a physical layer device having a FIFO buffer and media independent interface (MII) connection to a media access control (MAC). A FIFO read/write mechanism reads and writes data to the FIFO buffer, such that the FIFO buffer is read based upon the determined speed of the link partner in communication therewith, thus enhancing inter-packet gap space usage. In one aspect, the FIFO buffer is read at the beginning of a received packet when the link partner speed is determined to be faster. The FIFO buffer also includes a half-full pointer that is reconfigured based on the determined speed of a link partner for enhanced inter-packet gap space usage.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously extends the ethernet FIFO buffer such as used in a physical layer device (PHY) of an ethernet system having data terminal equipment (DTE) and a media access control (MAC) and connected by a media independent interface (MII) to the physical layer device. The present invention enhances the inter-packet gap space usage. The speed of the link partner in communication with the data terminal equipment (DTE) is determined using a first packet received within the FIFO buffer. Based upon this speed determination, an optimized reading of the FIFO buffer is implemented, allowing enhanced inter-packet gap space usage.

Figure 1:
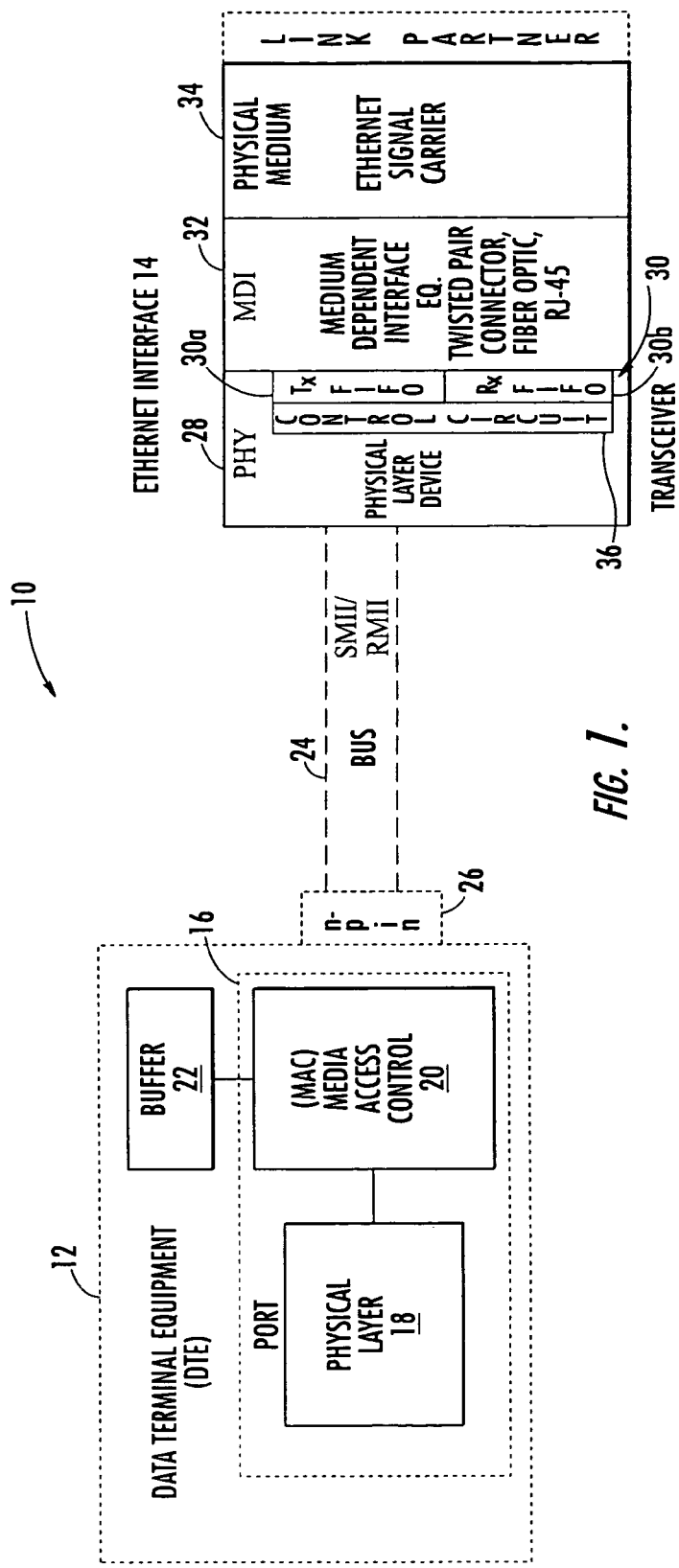
FIG. 1 is a block diagram of a portion of an ethernet system showing the port of a data terminal equipment (DTE) and an ethernet interface having a physical layer device (PHY) such as a transceiver, and also showing a media independent interface (MII) and associated components.

FIG. 1 illustrates at 10 a high level block diagram of an ethernet system, showing physical device hardware in block format as data terminal equipment (DTE) 12 (shown in dashed lines), such as a personal computer, which is connected to the ethernet system via an ethernet interface 14. The data terminal equipment 12 includes a port 16 (shown in dashed lines) having a physical layer 18 and media access control (MAC) 20, as known to those skilled in the art. A buffer 22 can be connected to the MAC as part of the terminal equipment as known to those skilled in the art.

A media independent interface 24 forms a type of data bus between associated ethernet components. It could be connected to the data terminal equipment (DTE) 12 by different connector devices, including an n-pin connector 26 (shown by dotted lines), e.g., a 40-pin connector, as used by many skilled in the art. The media independent interface (MII) is connected to the ethernet interface, which includes a physical layer device (PHY) 28 such as normally part of a transceiver as known to those skilled in the art, and having a transmit and receive First-In, First-Out (FIFO) buffer 30, including a Transmit FIFO 30a and Receive FIFO 30b. A read/write control circuit 36 provides control over the reading and writing of data into and out from the FIFO buffer 30. This physical layer device 28 is operable with a medium dependent interface (MDI) 32, which could be formed as a twisted-pair connector, fiberoptic connector, or other connector, as known to those skilled in the art. One connector example used by many skilled in the art is an RJ-45 connector used as a medium dependent interface. The physical medium 34 carries the ethernet data and is operable with the medium dependent interface 32. The medium independent interface (MMI), on the other hand, could be a serial media independent interface (SMII) or a reduced media independent interface (RMII).

The medium independent interface (MII) 24 includes the electronics that provide a means to link the ethernet media access control functions in a network device with the physical layer device (PHY), to transmit ethernet packet signals onto the network physical medium. The medium independent interface 24 can optionally support both 10-Mbps and 100-Mbps operation. Signaling differences are transparent because of the design of the medium independent interface 24. Line signals are translated into digital signals that are transmitted to ethernet chips used in various ethernet network devices.

As known to those skilled in the art, the serial media independent interface (SMII) and reduced independent interface (RMII) are both reduced interfaces from the standard media independent interface. There are many FIFO buffer devices that support media independent interfaces. At this time, a fewer number of devices support the reduced media independent interfaces, while the serial media independent interface is relatively new. The reduced media independent interface and serial media independent interface are advantageous because they achieve a reduced number of connector pins by increasing the clock frequency.

It is known that these interfaces are operable on a standard system clock driven from the media access control (MAC) 20. For example, in the reduced media independent interface (RMII), the clock speed can be doubled. In a serial media independent interface (SMII), the clock speed can be quadrupled, and this allows time slicing of the media independent interface data that enter an ethernet network device. In one example, the reduced media independent interface has half the system speed, while in another example, a serial media independent interface has one fifth the clock speed. Data is time sliced out from, for example, four pins onto two pins, or even one pin in some examples, reducing the number of pins.

As the interface is implemented and reduced, two clock domains are introduced, as known to those skilled in the art. The media independent interface (MII) can operate on a recovered 20 megahertz clock, as a non-limiting example. It is recovered from the data stream from the link partner in communication therewith. A network device can bridge data over to a reduced media interface protocol that is on a standard reference clock from the media access control (MAC), while running at a faster frequency. Thus, there are two clocks that are not synchronized. Although the media independent interface is supposed to be at about 25 megahertz in one example, it is probably slightly slower or slightly faster, and as a result, it is not possible to perform a straight latching up and transmission over to the device. Thus, the data has to be buffered through a FIFO buffer.

It has been conventional in a FIFO buffer in this type of system to allow the FIFO buffer to become half-full. It is at this point in time that the device begins reading from the FIFO buffer through means of an appropriate FIFO read/write control circuit. In this example, the entire portion of the packet is not buffered to the FIFO buffer. There is a minimal amount of clock timing difference between the two clock domains. It is evident, then, that the FIFO buffer only has to be large enough to buffer the amount of variation between the clocks. As a result, because the variation is small, the FIFO buffers can typically be about 64 bits, as a non-limiting example.

As noted before, prior art FIFO buffers are normally allowed to become half-full before the network ethernet devices begin reading the FIFO buffer. In the prior art devices, a FIFO read/write control circuit does not know if the link partner in communication therewith is running either a little faster or a little slower. By allowing the FIFO buffer to become half full, it is possible to fill it up more, or it can become less full by the time the end of packet (EOP) is reached. Thus, the full size of the FIFO buffer is not used and only half the FIFO buffer is realistically used.

The present invention extends the FIFO buffer 30 operating in an extended mode. The FIFO buffer 30 appears larger, while avoiding the limitations of any larger FIFO buffer designs. The larger FIFO buffer 30 has a greater tolerance for handling the link partner and local device frequency variances. A physically large FIFO buffer, however, cannot be used in ethernet applications because it will violate the smallest possible inter-packet gap (IPG) space as it buffers the received packets. In the present invention, a software register can be set to 0x10 bit, as a non-limiting example, to enable this mode of operation to be valid for both serial media independent interface or reduced media independent interface modes of operation.

At the outset, the FIFO buffer 30 uses the first packet transfer to determine a link partner speed. It then dynamically reconfigures itself to optimize the control over reading the FIFO buffer 36 as based upon the link partner speed. For example, if the link partner is determined to be running faster, then FIFO buffer reading would begin after the first data nibble, i.e., the 4 bits has been written, as a non-limiting example. Thus, the FIFO buffer uses nearly the full buffer size to buffer the data and dramatically increase the ability of a physically smaller FIFO buffer to obtain greater tolerance ratings.

Figure 2:
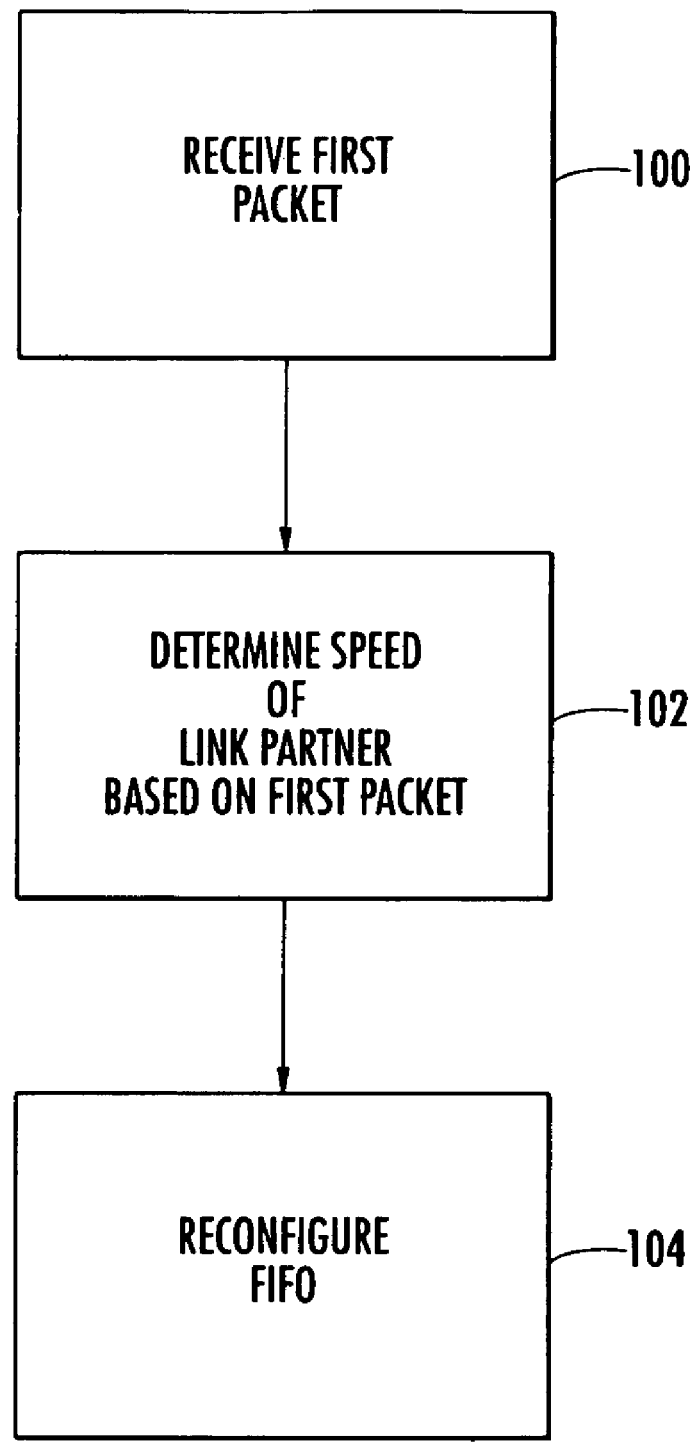
FIG. 2 is a high level flow chart showing an example of the method of the present invention.

As shown in the simplified flow chart of FIG. 2, a method of the present invention is operable and receives a first packet within the FIFO buffer 22 (block 100), and based on that first packet determines the speed of the link partner in communication therewith (Block 102). It is only after determining the speed of the link partner using this first packet, that the FIFO buffer is reconfigured (Block 104). It is evident that the FIFO buffer 22 starts off in the initial mode where the buffer is half filled with the first packet. The FIFO buffer then dynamically reconfigures itself. For example, if the link partner is determined to be faster, then the FIFO read/write control circuit 36 can begin reading the FIFO buffer when the second or subsequent packet initially arrives, such as after the first nibble of 4 bits has been written therein.

This optimization of the subsequent read operation of the FIFO buffer can occur, for example, by reconfiguring a half-full pointer used with the FIFO buffer, by techniques known to those skilled in the art. It is well known that the size of the FIFO buffer determines how large an inter-packet gap space can be handled at the ethernet interface. This is valid because at the end-of-packet (EOP), no matter how full the FIFO buffer is, there are many cycles that are required to empty out the FIFO buffer and prepare it for the next packet. Thus, the FIFO buffer is emptying out data into this inter-packet gap space within the ethernet environment between the frames (i.e., between the packets.) Thus, if there is a smaller FIFO buffer, it will empty out fewer bytes and as a result, it can empty out in a smaller inter-packet gap space to handle a more congested environment. Thus, more information can be placed on the ethernet environment even when there is greater traffic.

Figure 3:
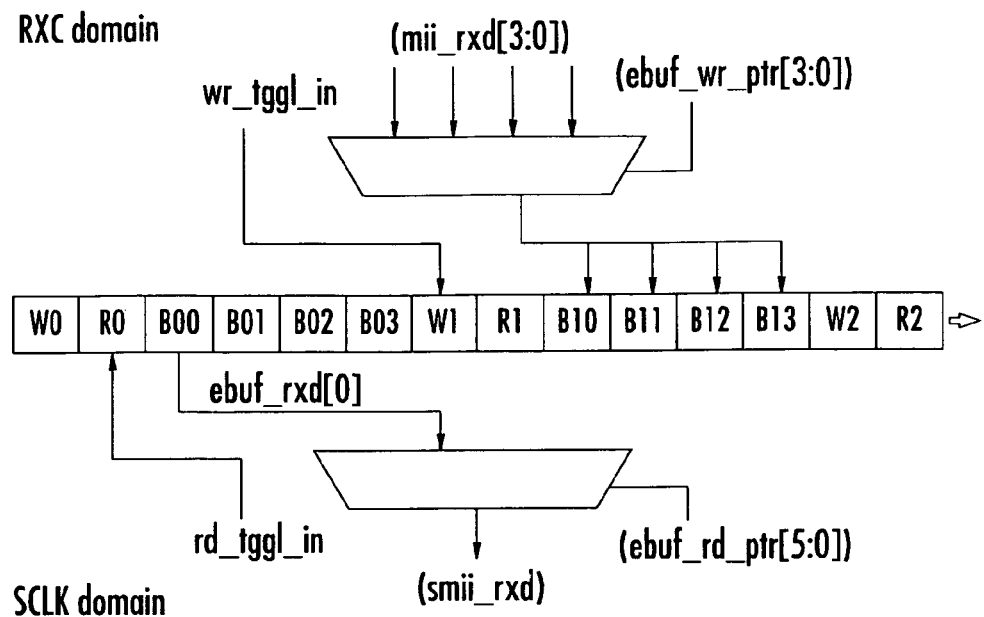
FIG. 3 is a fragmentary, "start read" diagram for an extended serial media independent interface (SMII) FIFO, as a non-limiting example.

FIG. 3 illustrates an extended serial medial independent interface FIFO "start read" diagram where the link partner has been found to be faster. This fragmentary diagram gives an example of two clock domains, such as the SCLK domain, i.e., the Synchronous with Clock Domain, which corresponds to the system clock (or reference clock) with the media access control 20. The RXC domain is the recovered clock domain that is associated with the media independent interface (MII) clock. The diagram illustrates how the FIFO buffer 30 can reconfigure itself after it has detected that the link partner is either slow or fast. The read and write toggle (wr_tggl_in; rd_tggl_in) is specific to one type of design, as a non-limiting example, and illustrates how toggle bits are used as control bits to identify each slot as being valid or not. The continuous stream of small frames or slots can be available for use by various devices and nodes in which access to a transmission medium may be organized. Typically, slots are known as a few tens or hundreds of bits long and can be marked full or empty. The device can receive an empty slot and fill it with data, set source and destination addresses, and mark it full. The elasticity buffer is also illustrated as part of the read and write with a write and read pointer. A horizontal line beginning with W0 and ending with R2 illustrates the address components, including Write (W), Buffer (B) and Read (R), as known to those skilled in the art.

Figure 4:
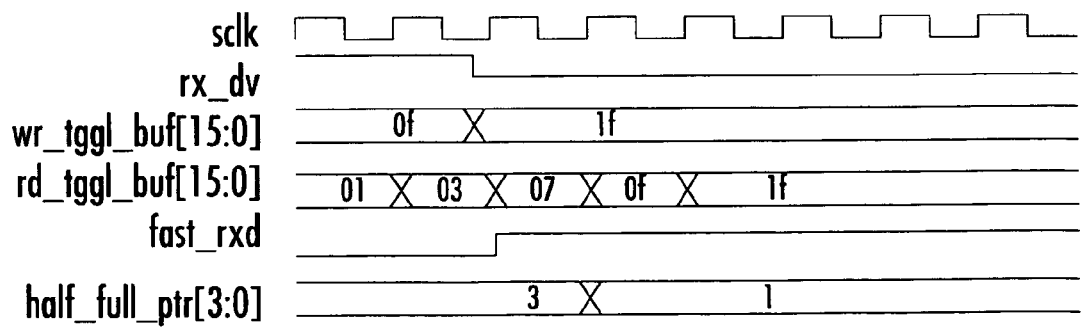
FIG. 4 is a timing diagram illustrating how one example of an extended FIFO buffer control mechanism works.

FIG. 4 illustrates a timing diagram showing on the top horizontal line the Synchronous with Clock Domain (SCLK) followed vertically down by the various timing lines extending horizontally across, including the second line for the rx-dv (valid), which is basically the control bit that identifies an incoming packet as being a valid packet.

Lines 3 and 4 illustrate the write and read toggle buffer (wr_tggl_buff; rd_tggle_buff). Line 5 is the fast rxd that is the control signal indicating that the link partner has been detected as faster in this particular example. A half full pointer (half_full_ptr [3:0]) is then illustrated.

It is evident that the present invention now allows the FIFO buffer in a physical layer device of an ethernet system having data terminal equipment (DTE) and a media access control (MAC) to be expanded when operable with a media independent interface (MII) to the physical layer device. In one aspect, the speed of the link partner is determined and subsequent reading of the FIFO buffer is optimized based on the determined speed of the link partner for enhancing the inter-packet gap space which can occur by reconfiguring a half-full pointer used the FIFO buffer.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of extending a FIFO buffer in a physical layer device of an Ethernet system having data terminal equipment (DTE) and a media access control (MAC) and connected by a media independent interface (MII) to the physical layer device comprising the steps of:
   determining an increased speed of a link partner within the Ethernet system in communication with data terminal equipment (DTE) using a first packet received within the FIFO buffer by initially filling the FIFO buffer substantially half-full with the first packet and if the link partner has been found to be faster, reconfiguring a half-full pointer used with the FIFO buffer; and
   optimizing subsequent reading of the FIFO buffer based on the increased speed of the link partner for enhancing an inter-packet gap space usage by using toggle bits as control bits to identify slots as valid or not such that a FIFO read/write control circuit can begin reading the FIFO buffer when a second or subsequent packet initially arrives.

2. The method according to claim 1 and further comprising the step of reading the FIFO buffer after only a first nibble of four bits has been written therein when the link partner has been determined to be running faster.

3. The method according to claim 1 wherein the media independent interface (MII) comprises one of a serial media independent interface (SMII) or a reduced media independent interface (RMII).

4. The method according to claim 1 and further comprising the step of using a control bit to identify an incoming packet as a valid packet.

5. The method according to claim 1 and further comprising the step of operating the media access control (MAC) with a reference clock and operating the media independent interface (MII) with a recovered clock.

6. The method according to claim 1 and further comprising the step of connecting the media independent interface (MII) to the media access control (MAC) with an n-pin connector.

7. A method of extending a FIFO buffer in a physical layer device of an Ethernet system having data terminal equipment (DTE) and a media access control (MAC) and connected by a media independent interface (MII) to the physical layer device comprising the steps of:
   determining an increased speed of a link partner within the Ethernet system in communication with data terminal equipment (DTE) after filling the FIFO buffer to a half-full position with a first packet received within the FIFO buffer by initially filling the FIFO buffer substantially half-full with the first packet and if the link partner has been found to be faster, reconfiguring a half-full pointer used with the FIFO buffer; and
   optimizing subsequent reading of the FIFO buffer based on the increased speed of the link partner for enhancing an inter-packet gap space usage by using toggle bits as control bits to identify slots as valid or not such that a FIFO read/write control circuit can begin reading the FIFO buffer when a second or subsequent packet initially arrives.

8. The method according to claim 7 and further comprising the step of reading the FIFO buffer after only a first nibble of four bits has been written therein when the link partner has been determined to be running faster.

9. The method according to claim 7 wherein the media independent interface (MII) comprises one of a serial media independent interface (SMII) or a reduced media independent interface (RMII).

10. The method according to claim 7 and further comprising the step of using a control bit to identify an incoming packet as a valid packet.

11. The method according to claim 7 and further comprising the step of operating the media access control (MAC) with a reference clock and operating the media independent interface (MII) with a recovered clock.

12. The method according to claim 7 and further comprising the step of connecting the media independent interface (MII) to the media access control (MAC) with an n-pin connector.

13. A method of extending a FIFO buffer in a physical layer device of an Ethernet system having data terminal equipment (DTE) and a media access control (MAC) and connected by a media independent interface (MII) to the physical layer device comprising the steps of:
   evaluating toggle bits as control bits of a first packet received within the FIFO buffer to identify slots as valid or not;
   determining a number of slots that remain to be read before the FIFO buffer is empty;
   determining if a speed of a link partner in communication therewith is faster; and
   reconfiguring a half-full pointer used with the FIFO buffer such that a FIFO read/write control circuit can begin reading of the FIFO buffer when a second or subsequent packet initially arrives based on the increased speed of the link partner and enhancing an inter-packet gap space usage.

14. The method according to claim 13 and further comprising the step of reading the FIFO buffer after only a first nibble of four bits has been written therein when the link partner has been determined to be running faster.

15. The method according to claim 13 wherein the media independent interface (MII) comprises one of a serial media independent interface (SMII) or a reduced media independent interface (MII).

16. The method according to claim 13 and further comprising the step of using a control bit to identify an incoming packet as a valid packet.

17. The method according to claim 13 and further comprising the step of operating the media access control (MAC) with a reference clock and operating the media independent interface (MII) with a recovered clock.

18. The method according to claim 13 and further comprising the step of connecting the media independent interface (MII) to the media access control (MAC) with an n-pin connector.

19. An Ethernet device comprising:
   a physical layer device having a FIFO buffer and media independent interface (MII) connection to a media access control (MAC); and
   a FIFO read/write control circuit for reading and writing data to the FIFO buffer such that the FIFO buffer is read based on the determined speed of a link partner in communication therewith for enhancing inter-packet gap space usage by initially filling the FIFO buffer substantially half-full with a first packet and if the link partner has been found to be faster, reconfiguring a half-full pointer used with the FIFO buffer, and using toggle bits as control bits to identify slots as valid or not such that a FIFO read/write control circuit can begin reading the FIFO buffer when a second or subsequent packet initially arrives.

20. The Ethernet device according to claim 19 wherein said media independent interface (MII) comprises one of a serial media independent interface (SMII) or a reduced media independent interface (RMII).

21. The Ethernet device according to claim 19 and further comprising a recovered clock for the media independent interface (MII) based on a system clock associated with the media access control (MAC).

* * * * *

UNITED STATES PATENT AND TRADEMARK OFFICE
CERTIFICATE OF CORRECTION

PATENT NO. : 7,072,349 B2
APPLICATION NO. : 09/969137
DATED : July 4, 2006
INVENTOR(S) : Kenton G. DeHart It is certified that error appears in the above-identified patent and that said Letters Patent is hereby corrected as shown below:

Column 1, Line 66    Delete: "(IGP)"
    Insert: -- (IPG) --

Column 4, Line 26    Delete: "(MMI)"
    Insert: -- (MII) --

Column 6, Line 56    Delete: "tggle"
    Insert: -- tggl --

Column 8, Line 47    Delete: "(MII)"
    Insert -- (RMII) --

Signed and Sealed this

Sixteenth Day of January, 2007

JON W. DUDAS
*Director of the United States Patent and Trademark Office*